US012659321B2

(12) United States Patent
McGuire et al.

(10) Patent No.: US 12,659,321 B2
(45) Date of Patent: Jun. 16, 2026

(54) USING AN ARTIFICIAL INTELLIGENCE (AI)-BASED DECISION MAKING ENGINE TO IDENTIFY AI ATTACK EVENTS

(71) Applicant: International Business Machines Corporation, Armonk, NY (US)

(72) Inventors: Michael James McGuire, Sydney (AU); James David Cleaver, Grose Wold (AU); Tamer Aboualy, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 18/416,712

(22) Filed: Jan. 18, 2024

(65) Prior Publication Data

US 2025/0240307 A1    Jul. 24, 2025

(51) Int. Cl.
*H04L 9/40* (2022.01)
*G06N 5/02* (2023.01)

(52) U.S. Cl.
CPC ........... *H04L 63/1416* (2013.01); *G06N 5/02* (2013.01)

(58) Field of Classification Search
CPC ... H04L 63/1416; H04L 63/1425; G06N 5/02; G06N 20/00
USPC .......................................................... 726/23
See application file for complete search history.

(56) References Cited

U.S. PATENT DOCUMENTS

| | | | | |
|---|---|---|---|---|
| 11,153,333 B1 * | 10/2021 | Hermoni | ............. | G06F 11/0787 |
| 11,651,313 B1 * | 5/2023 | Fridakis | ............. | G06Q 10/0635 |
| | | | | 705/7.28 |
| 2010/0281539 A1 * | 11/2010 | Burns | ................. | H04L 63/1441 |
| | | | | 726/13 |
| 2013/0276125 A1 * | 10/2013 | Bailey | .................... | G06F 21/46 |
| | | | | 726/25 |

(Continued)

FOREIGN PATENT DOCUMENTS

| | | |
|---|---|---|
| CN | 108289088 A | 7/2018 |
| KR | 102183897 B1 | 11/2020 |

OTHER PUBLICATIONS

Cabra, P., "An AI for an AI: LLM-based Detection of GPT-Generated BEC Attacks," Perception Point, Jun. 25, 2023, 9 pages, retrieved from https://perception-point.io/blog/an-ai-for-an-ai-llm-based-detection-of-gpt-generated-bec-attacks/.

(Continued)

*Primary Examiner* — Badri Narayanan Champakesan
*Assistant Examiner* — Badri Champakesan
(74) *Attorney, Agent, or Firm* — Kristofer Haggerty

(57) ABSTRACT

A computer-implemented method (CIM) according to one embodiment includes obtaining first endpoint data associated with first actions performed by one or more first user devices of a network environment. The CIM further includes inputting the first endpoint data into a predetermined artificial intelligence (AI)-based decision making engine, where the predetermined AI-based decision making engine is configured to determine, based on endpoint data, whether actions constitute an AI attack event. In response to a determination that an output of the predetermined AI-based decision making engine indicates that at least some of the first actions constitute an AI attack event, an alert that indicates that the at least some of the first actions likely constitute an AI attack event is output.

16 Claims, 5 Drawing Sheets

(56) References Cited

U.S. PATENT DOCUMENTS

| | | | |
|---|---|---|---|
| 2014/0310811 A1* | 10/2014 | Hentunen | H04L 63/145 726/23 |
| 2015/0074807 A1* | 3/2015 | Turbin | H04L 63/145 726/23 |
| 2015/0264068 A1* | 9/2015 | Beauchesne | H04L 63/1416 726/23 |
| 2018/0103047 A1* | 4/2018 | Turgeman | G06Q 20/4014 |
| 2020/0366689 A1* | 11/2020 | Lotia | H04L 63/1483 |
| 2021/0194924 A1* | 6/2021 | Heinemeyer | G06F 21/577 |
| 2021/0306145 A1* | 9/2021 | Krauthamer | H04L 9/0852 |
| 2022/0224706 A1* | 7/2022 | Peng | G06N 3/08 |
| 2023/0132703 A1* | 5/2023 | Marsenic | H04L 63/1433 726/25 |
| 2023/0269263 A1* | 8/2023 | Yarabolu | G06F 18/2155 726/22 |
| 2025/0168186 A1* | 5/2025 | McDonald | H04L 63/1433 |

OTHER PUBLICATIONS

Bahnsen et al., "DeepPhish: Simulating Malicious AI," WordPress. com, 2018, 9 pages, retrieved from https://albahnsen.files.wordpress. com/2018/05/deepphish-simulating-malicious-ai_submitted.pdf.

Kaloudi et al., "The AI-Based Cyber Threat Landscape: A Survey," ACM Computing Surveys, Feb. 2020, 35 pages.

Microsoft, "With Security Copilot, Microsoft brings the power of AI to cyberdefense," Microsoft News Center, Mar. 28, 2023, 3 pages, retrieved from https://news.microsoft.com/2023/03/28/with-security-copilot-microsoft-brings-the-power-of-ai-to-cyberdefense/.

Microsoft, "Automating threat actor tracking: Understanding attacker behavior for intelligence and contextual alerting," Microsoft Threat Intelligence, Apr. 1, 2021 (updated Aug. 3, 2022), 7 pages, retrieved from https://www.microsoft.com/en-us/security/blog/2021/04/01/automating-threat-actor-tracking-understanding-attacker-behavior-for-intelligence-and-contextual-alerting/.

* cited by examiner

100

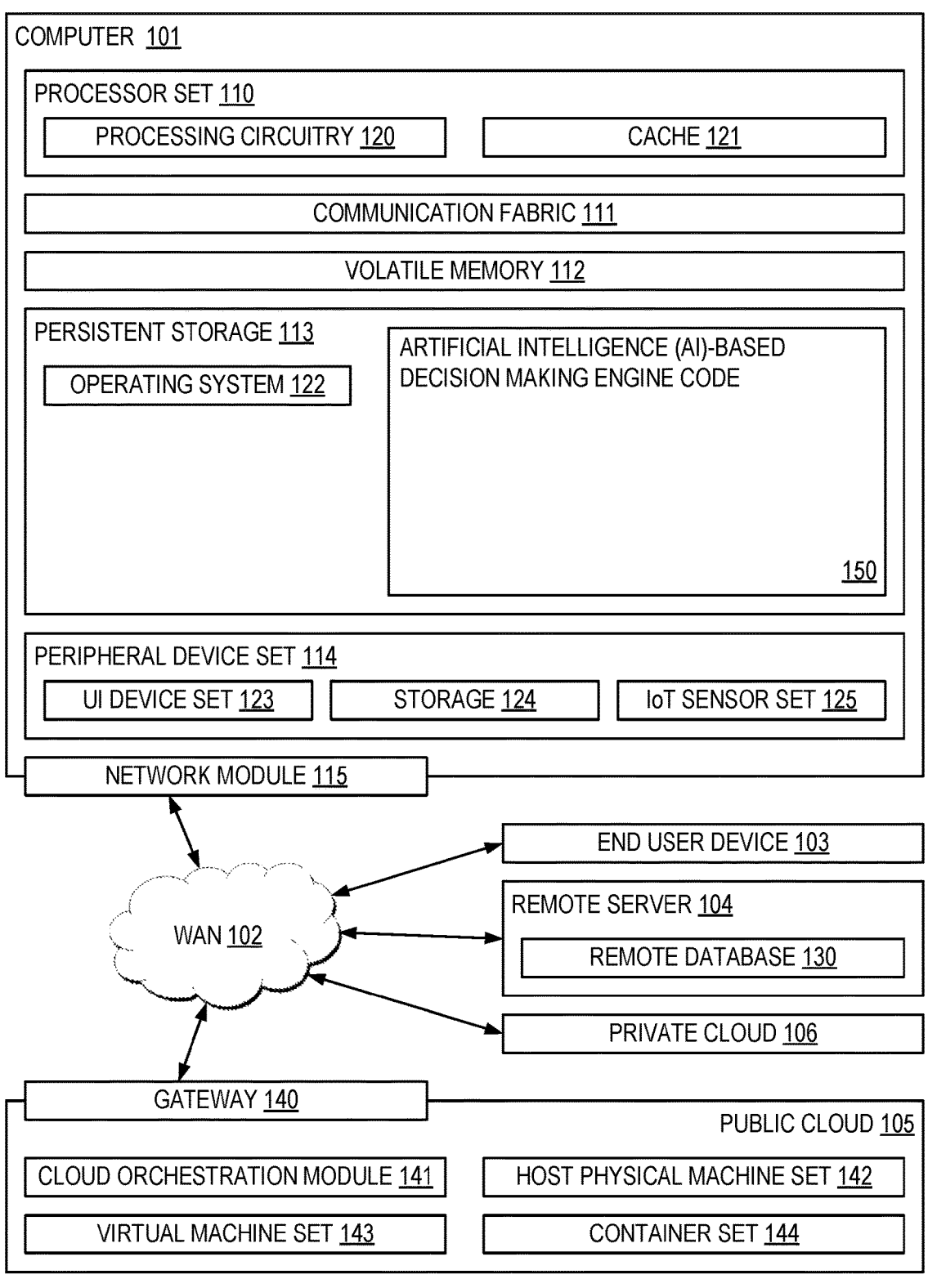

COMPUTER 101

PROCESSOR SET 110

PROCESSING CIRCUITRY 120        CACHE 121

COMMUNICATION FABRIC 111

VOLATILE MEMORY 112

PERSISTENT STORAGE 113

OPERATING SYSTEM 122

ARTIFICIAL INTELLIGENCE (AI)-BASED DECISION MAKING ENGINE CODE

150

PERIPHERAL DEVICE SET 114

UI DEVICE SET 123        STORAGE 124        IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141        HOST PHYSICAL MACHINE SET 142

VIRTUAL MACHINE SET 143        CONTAINER SET 144

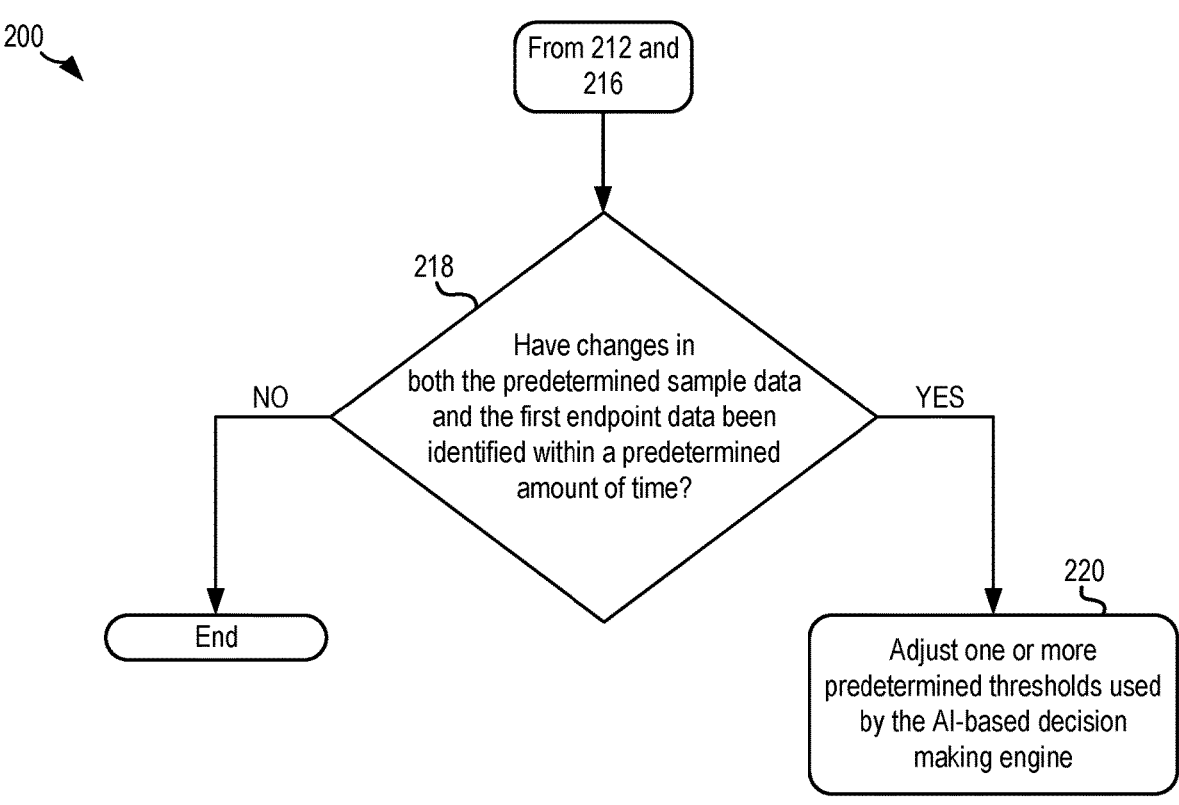

From 212 and 216

218

Have changes in both the predetermined sample data and the first endpoint data been identified within a predetermined amount of time?

NO

YES

End

220

Adjust one or more predetermined thresholds used by the AI-based decision making engine

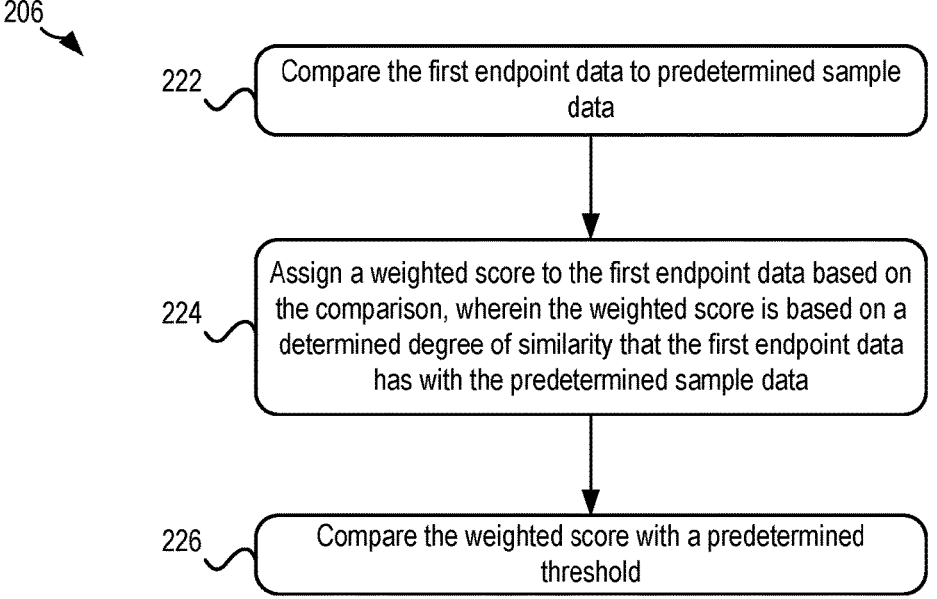

222

Compare the first endpoint data to predetermined sample data

224

Assign a weighted score to the first endpoint data based on the comparison, wherein the weighted score is based on a determined degree of similarity that the first endpoint data has with the predetermined sample data

226

Compare the weighted score with a predetermined threshold

FIG. 2B

USING AN ARTIFICIAL INTELLIGENCE (AI)-BASED DECISION MAKING ENGINE TO IDENTIFY AI ATTACK EVENTS

BACKGROUND

The present invention relates to artificial intelligence, and more specifically, this invention relates to AI attack events.

Network environments often include at least one user device, which may include, e.g., laptop computers, desktop computers, cellular phones, etc. Within network environments that include a plurality of user devices and/or other devices, at least some of the devices may be configured to communicate with one another and exchange data, e.g., upload data and/or download data, in the process of doing so.

During operative use of these user devices, data is typically generated and stored locally on the user devices and/or uploaded to another location, e.g., such as a cloud server. More specifically, data may be generated at an "endpoint" that may be defined as a device at which data is generated and/or computed, and thereafter the data may be stored on the endpoint and/or migrated to another device within the network environment. In multi-device network environments, a plurality of devices may together perform predetermined processes in which each of the devices performs at least one contributing operation. For example, a predetermined business process that is associated with a stock market may include a plurality of user devices around the world performing stock trade operations, e.g., where the user devices are endpoints, which change the stock price of an associated stock. These trades may result in the production of publicly available associated information, e.g., sales may be publicly shared to update an available stock volume, in addition to private information that is not to be shared with the public, e.g., banking information associated with the stock trade operations.

SUMMARY

A computer-implemented method (CIM) according to one embodiment includes obtaining first endpoint data associated with first actions performed by one or more first user devices of a network environment. The CIM further includes inputting the first endpoint data into a predetermined artificial intelligence (AI)-based decision making engine, where the predetermined AI-based decision making engine is configured to determine, based on endpoint data, whether actions constitute an AI attack event. In response to a determination that an output of the predetermined AI-based decision making engine indicates that at least some of the first actions constitute an AI attack event, an alert that indicates that the at least some of the first actions likely constitute an AI attack event is output.

A computer program product (CPP), according to another embodiment, includes a set of one or more computer-readable storage media, and program instructions, collectively stored in the set of one or more storage media, for causing a processor set to perform the foregoing method.

A computer system (CS), according to another embodiment, includes a processor set, a set of one or more computer-readable storage media, and program instructions, collectively stored in the set of one or more storage media, for causing the processor set to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one embodiment of the present invention.

FIG. 2B is a flowchart of sub-operations of an operation of FIG. 2A, in accordance with one embodiment of the present invention.

DETAILED DESCRIPTION

Figure 2A:
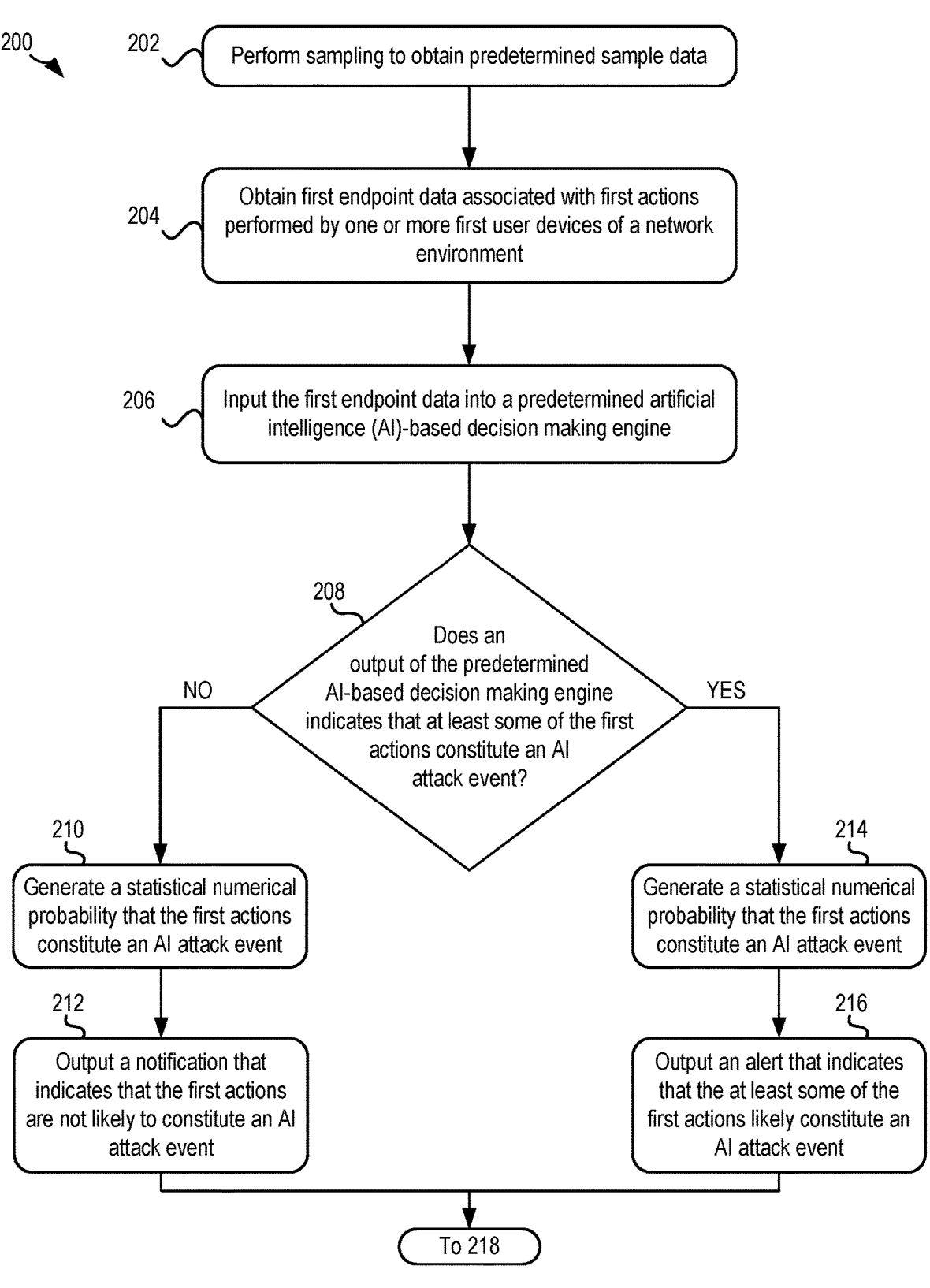
FIG. 2A is a flowchart of a method, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for using an AI-based decision making engine to identify AI attack events.

In one general embodiment, a CIM includes obtaining first endpoint data associated with first actions performed by one or more first user devices of a network environment. The CIM further includes inputting the first endpoint data into a predetermined artificial intelligence (AI)-based decision making engine, where the predetermined AI-based decision making engine is configured to determine, based on endpoint data, whether actions constitute an AI attack event. In response to a determination that an output of the predetermined AI-based decision making engine indicates that at least some of the first actions constitute an AI attack event, an alert that indicates that the at least some of the first actions likely constitute an AI attack event is output.

In another general embodiment, a CPP includes a set of one or more computer-readable storage media, and program instructions, collectively stored in the set of one or more storage media, for causing a processor set to perform the foregoing method.

In another general embodiment, a CS includes a processor set, a set of one or more computer-readable storage media, and program instructions, collectively stored in the set of one or more storage media, for causing the processor set to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as AI-based decision making engine code of block 150 for using an AI-based decision making engine to identify AI attack events. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As mentioned elsewhere above, network environments often include at least one user device, which may include, e.g., laptop computers, desktop computers, cellular phones, etc. Within network environments that include a plurality of user devices and/or other devices, at least some of the devices may be configured to communicate with one another and exchange data, e.g., upload data and/or download data, in the process of doing so.

During operative use of these user devices, data is typically generated and stored locally on the user devices and/or uploaded to another location, e.g., such as a cloud server. More specifically, data may be generated at an "endpoint" that may be defined as a device at which data is generated and/or computed, and thereafter the data may be stored on the endpoint and/or migrated to another device within the network environment. In multi-device network environments, a plurality of devices may together perform predetermined processes in which each of the devices performs at least one contributing operation. For example, a predetermined business process that is associated with a stock market may include a plurality of user devices around the world performing stock trade operations, e.g., where the user devices are endpoints, which change the stock price of an associated stock. These trades may result in the production of publicly available associated information, e.g., sales may be publicly shared to update an available stock volume, in addition to private information that is not to be shared with the public, e.g., banking information associated with the stock trade operations.

Despite efforts taken to ensure that private information remains private, unauthorized devices often attempt to fraudulently access and steal information within network environments, e.g., in attack events that are performed on one or more user devices. In some cases, these attack events are performed by user devices that are manually operated by fraudulent actors. In some other cases, computer programs are run that are configured to perform such attack events. In some of these cases, artificial intelligence (AI)-based and/or AI-assisted threat actors target an organization's information systems and/or computing assets. AI based attacks are likely to be relatively highly sophisticated and execute in relatively much shorter of a duration than manually performed attack events, and therefore have a relatively greater business impact. Conventional defensive measures fail to adequately protect user devices from such attack events. Furthermore, conventional defensive measures are flawed. For example, enforcement of multifactor authentication (MFA) in business transactions has an inherent weakness in that many forms of MFA are able to be "spoofed" by AI. Accordingly, there is a longstanding need within the technical field of network environments that include user devices for techniques that proactively and decisively mitigate the various attack events that would otherwise result in one or more forms of damage and/or loss on user devices.

In sharp contrast to the deficiencies of the conventional defensive measures described above, the techniques of embodiments and approaches described identify whether AI-based attacks are present in a network environment and attempting to exploit, compromise, impersonate users and/or systems to perform system and/or business process, and in response to such an identification, causing remediating actions to be performed. More specifically, the techniques described herein identify and remediate AI-based attack events by measuring norms against a plurality of attributes, and establishing a normal baseline at an individual, department, and/or global/industry level. In response to a determination that a triggering threshold is reached by an abnormality being detected, further authentication and/or controls, or review of systems and/or events may be required. These techniques for identification and remediation are important because attack events are becoming relatively more efficient, more personalized, more frequent, and more damaging. The resources available to an AI-bot are relatively greater than those of a human actor. For example, an AI-based actor may be configured to orchestrate attacks in parallel and in different dimensions, to multiple targets, simultaneously.

Now referring to FIG. 2A, a flowchart of a method 200 is shown according to one embodiment. The method 200 may be performed in accordance with the present invention in any of the environments depicted in FIGS. 1-4, among others, in various embodiments. Of course, more or fewer operations than those specifically described in FIG. 2A may be included in method 200, as would be understood by one of skill in the art upon reading the present descriptions.

Each of the steps of the method 200 may be performed by any suitable component of the operating environment. For example, in various embodiments, the method 200 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 200 may be performed in any type of network environment that includes at least one device, e.g., such as a user device, that is subject to being compromised, e.g., lose functionality, have data accessed by unauthorized parties, experience targeted latency, etc., by a malicious device that initiates an AI attack event.

Operation 204 of method 200 includes obtaining first endpoint data associated with first actions performed by one or more first user devices of a network environment. The first endpoint data may be obtained for one or more reasons. For example, in some approaches, the first endpoint data is obtained, e.g., on an ongoing periodic basis, in response to a determination that performance of the one or more first user devices has decreased at least a predetermined amount within a predetermined amount of time, in response to a determination that user credentials may have been compromised in a data breach event, etc.

The first actions may include any type of action that may be performed by and/or using user devices. Several illustrative examples of such actions may include, e.g., performing stock trades, accessing different data files, performing edits on data, sending emails which may include one or more attachments, executing transactions, etc. The first endpoint data may include any type of information associated with one or more of the actions that are performed. More specifically, the first endpoint data may, in some approaches, include computer performance metrics, transaction metrics, information detailing a plurality of computer performance metrics relative to one another, timestamp information, etc. Specific examples of these metrics that may be assessed by obtaining the first endpoint data, in some approaches, include measurements of computer initiated transactions, e.g., a speed at which transactions are performed over a predetermined period of time, a frequency of transactions that are performed over a predetermined period of time, etc. It should be noted that these measurements may record changes in transactions or other computer initiated operations in more than one dimension of performance of one or more of the first user devices. For example, the first endpoint data may include measurements that detail a rate at which actions are performed, e.g., the transaction rate of a first subset of the first user devices decreasing over a predetermined amount of time and measurements that detail the transaction rate of a second subset of the first user devices increasing over the predetermined amount of time.

Predetermined types of metrics that may be included in the obtained first endpoint data may, in some approaches, additionally and/or alternatively include collective actions. These measurements of collective actions may be used to identify a relatively large range of relatively small transactions that have a relatively large collective outcome on a predetermined process. The types of metrics that may be included in the obtained first endpoint data may, in some approaches, additionally and/or alternatively include multiple operator affect information, e.g., metadata and/or other digital transaction receipts that detail multiple operators affecting the same item and/or account and/or outcome. Organizational outputs of a type that would become apparent to one of ordinary skill in the art after reading the descriptions herein may additionally and/or alternatively be metrics types that may be included in the obtained first endpoint data, e.g., what can a considered organization affect, a number of credit cards issued, a number of licenses issued, etc.

Speed of actions is another metric that may be detailed in the obtained first endpoint data. For example, first endpoint data that details speed of action metrics may specifically detail, e.g., the speed at which actions are taken, a change in the time gap between sequentially performed actions, etc. Similarly, an order in which actions are performed, e.g., the order of steps taken within a predetermined process may be an additional and/or other metric of the obtained first endpoint data. The metrics may additionally and/or alternatively include one or more of a time of day that the actions are performed (which may be detailed in obtained timestamps), a relative regularity with which the actions are performed, a frequency of actions (i.e. how often this action is typically executed within a predetermined amount of time), corresponding tasks to the actions (such as sending an email after executing a transaction), etc.

Another metric that may be detailed in the obtained first endpoint data includes a magnitude of action(s) that are performed by one or more of the first user devices. For context, the "magnitude" of a given action may be defined as a scope of the action relative to other actions that are performed over a predetermined amount of time and/or relative to a business practice, e.g., a magnitude of the actions that is based on a relative size of a transaction associated with the actions with respect to a predetermined business practice that the transaction is a part of. A reason that an action is performed may additionally and/or alternatively be a metric that is detailed in the first endpoint data that is obtained, e.g., a triggering action, a query, a predetermined sequence of actions of a process being performed, etc.

The obtained first endpoint data may additionally and/or alternatively include contextual metrics, e.g., such as contextual information of previously performed actions that thereby detail whether the first actions are typically performed and/or initiated by a bot or a person, e.g., some actions are only executed by a bot and/or robotic process automation (RPA) during normal operation. Timing for subsequent linked actions (whether subsequent actions of a predetermined process that includes the first actions are performed within a predetermined amount of time) and/or a magnitude of the first actions are other metrics that may additionally and/or alternatively be detailed in the obtained first endpoint data. The obtained first endpoint data may additionally and/or alternatively include variance metrics that detail whether the operations and/or input for causing the performance of the first actions varies from a predetermined number of other iterations of the first actions being performed. One particular use case in which the obtained first endpoint data includes such variance metrics includes style variance in text documents. For example, some first endpoint data may include text generated by a person during normal behavior, and be identified as including a relatively poorly phrased transaction description, e.g., based on detected keywords, based on detected inconsistencies, etc. In contrast, other first endpoint data may be determined to include text generated by an AI attacker bot based on the other first endpoint data including relatively better phrased text, e.g., the AI attacker bot may not incorporate the inconsistencies described above. A number of user devices that contribute to the performance of one or more of the first actions may be yet another metric that may be detailed in the obtained first endpoint data.

For context, the first endpoint data is, in some preferred approaches, obtained and used to determine whether the first actions constitute an AI attack event. In other words, although the first actions may appear to be actions that are ordinarily performed in the network environment, the first actions may in fact be performed as a part of an AI attack event that is initiated by the first user devices and/or a malicious actor/device that is controlling the first user devices. An AI-based engine may, in some approaches, be used in order to make such a determination. For example, one or more of such approaches may include inputting the first endpoint data into a predetermined AI-based decision making engine, e.g., see operation 206. In such approaches, the predetermined AI-based decision making engine may be configured to determine, based on endpoint data, whether actions constitute an AI attack event. The predetermined AI-based decision making engine is, in some preferred approaches, a component of and/or program running on a device that is performing method 200. In contrast, in some other approaches, the first endpoint data is output from the device that is performing method 200 to the predetermined AI-based decision making engine, and an output of the predetermined AI-based decision making engine may be returned and received by the device that is performing method 200. Various techniques by which the predetermined AI-based decision making engine may perform such a determination and/or be instructed to perform such a determination are described below.

The predetermined AI-based decision making engine may, in some approaches, be configured to determine whether actions, e.g., such as the first actions, constitute an AI attack event by performing a predetermined comparison process. In some approaches, this predetermined comparison process uses predetermined sample data in addition to the obtained first endpoint data. Accordingly, method 200 optionally includes performing sampling to obtain predetermined sample data, e.g., see operation 202. In some approaches, this predetermined sample data may be obtained by performing a sampling on the one or more first user devices. The sampling is, in some approaches, performed prior to the first actions being performed to establish and understand baseline behaviors of the one or more user devices. In contrast, in some approaches, at least some of the sampling may be performed after the first actions are performed. However, it should be noted that because the first actions may constitute an AI attack event in which normal function of the first user devices is abnormal and/or under the control of a malicious actor and/or device, in some preferred approaches, the sampling is performed before the first actions are performed, e.g., such as during a time in which the first user devices are ensured to not be under the control of a malicious actor and/or device. Performing such sampling may additionally and/or alternatively include obtaining the predetermined sample data by performing a sampling on other user devices. For context, these other user devices are different than the first device(s). Furthermore, the other user devices may, in some approaches, perform second actions that are similar (have at least a predetermined degree of similarity) to the first actions, but that are different than the first actions. In some approaches, the other user devices include other user devices of a same organization that at least some of the first user devices are members of. In some other approaches, the other user devices are of a different organization than the organization that at least some first user devices are members of. In yet some other approaches, the other user devices are other user devices that also perform the first actions, e.g., at a different time and/or execution path than the first actions being performed by the first user devices.

Looking to FIG. 2B, exemplary sub-operations of performing a predetermined comparison process are illustrated in accordance with one embodiment, one or more of which may be used to perform operation 206 of FIG. 2A. However, it should be noted that the sub-operations of FIG. 2B are illustrated in accordance with one embodiment which is in no way intended to limit the invention.

Sub-operation 222 includes comparing the first endpoint data to predetermined sample data. Comparison techniques that would become apparent to one of ordinary skill in the art after reading the descriptions herein may be used. These comparison techniques, in some preferred approaches, include comparing predetermined types of metrics of the first endpoint data to the same predetermined types of metrics of the predetermined sample data. For example, for some approaches in which the predetermined sample data is based on a sampling performed on one or more of the first user devices, e.g., a rate at which second actions were previously performed by one or more of the first user devices during the sampling period is compared with a rate at which the first actions were recorded in the first endpoint data as being performed by the first user devices. In contrast, for some other approaches in which the predetermined sample data is based on a sampling performed on one or more other user devices, e.g., a rate at which second actions were previously performed by one or more of the other user devices during the sampling period is compared with a rate at which the first actions were recorded in the first endpoint data as being performed by the first user devices. These second actions may, in some approaches, be performed by other user devices that are known to not be AI attackers, e.g., control group user devices in a controlled environment that is ensured to not be vulnerable to AI attackers. In these approaches, the second actions were previously performed by one or more of the other user devices that are preferably the same type of actions and/or are determined to have at least a predetermined degree of similarity with the first actions. In some other approaches, at least some of the second actions may have been performed by one or more of the other user devices at the same time that the first actions were performed and/or after the first actions are performed, e.g., currently being performed.

A weighted score may be assigned to the first endpoint data based on the comparison, e.g., see sub-operation 224. The weighted score is, in some preferred approaches, based on a determined degree of overall similarity that the first endpoint data has with the predetermined sample data, e.g., considers all of the first actions performed. In other words, in one or more of such approaches, at least some of the first endpoint data is assigned a relatively lower score in response to a determination, based on the comparison, that the first endpoint data is relatively not similar to the predetermined sample data, while in contrast, at least some of the first endpoint data is assigned a relatively higher score in response to a determination, based on the comparison, that the first endpoint data is relatively similar to the predetermined sample data. In contrast, in some other approaches, a plurality of weighted score values are determined, e.g., a different weighted score value for each of the first actions performed, and each of the weighted score values may be compared with an associated portion of the predetermined sample data. In some approaches, the weighted score is a value that reflects the determined degree of similarity, and the value may be of a predetermined scale, e.g., 0%-100%, 0%-10%, 1%-100%, etc.

It should be noted that the comparison techniques described elsewhere above tend to prioritize, e.g., assign relatively higher weighted scores, evaluated actions that can be determined to not be outside of normal and/or expected behavior of user devices, e.g., where such normal and/or expected behavior is represented by the predetermined sample data. This is, at least in part, because actions that in fact constitute an AI attack event likely will not completely match the actions performed by the user devices, because such AI attack events are coordinated by a different program and/or device having different processing capabilities. For example, assuming that the first endpoint data is based on first actions performed by an AI bot that is controlling at least some of the user devices, transactions of the first actions are likely to be initiated and/or completed at relatively greater speeds and/or frequencies (or relatively lesser speeds and/or frequencies by an AI bot that is intentionally underperforming in order to not be detected) than other actions that are otherwise performed by user narrations and/or programs on other user devices.

It may be noted that, in some use cases, a bot may intermittently contribute and thereby perform some of the actions of a predetermined process (or alternatively a bot may take over for another bot for one or more of the actions), which may result in a change in the metric values recorded for the associated performed actions. However, the techniques described herein are preferably configured to recognize and/or further investigate such instances to determine whether these changes are specific to department normalization and/or are based on different individual users guiding such actions. For example, in some approaches, in response to a determination, based on results of the comparison, that the weighted score falls outside of a predetermined acceptable range, an application log that is associated with the first actions may be evaluated to determine whether predetermined application operations were used to perform the first actions, and the method may adapt to prevent the first actions from being determined to constitute an AI attack event. In another approach, in response to a determination, based on results of the comparison, that the weighted score falls outside of a predetermined acceptable range the first actions may be flagged as being abnormal and potentially indicative of an AI attack event. Although, in some of these approaches, metrics associated with the first actions are not similar to the metrics associated with other actions of predetermined sample data, an output of the predetermined AI-based decision making engine may nonetheless indicate, e.g., flag, that at least some of the first actions constitute an AI attack event as a precaution. Of course, in some approaches, troubleshooting may be performed thereafter in order to further verify whether the first actions constitute an AI attack event. In yet another approach, records of users, e.g., user work schedules, user credential login sequences, user credential logout sequences, etc., may be considered to determine whether a user was accessing one or more of the first user devices at the time the relatively abnormal first endpoint data was generated and/or obtained. This way, verification operations may be performed in order to determine whether the user accessing one or more of the first user devices was in fact the cause of the relatively abnormal first endpoint data. For example, these verification operations may, in some approaches, include, e.g., querying the user to attest whether the user performed one or more of the first actions, checking audio and/or video devices that recorded data while the first user devices performed the first actions, etc. A predetermined verification process is described elsewhere below.

The weighted score may, in some approaches, be compared with a predetermined threshold, e.g., see sub-operation 226. The predetermined threshold may be set and/or dynamically adjusted and, in some approaches, is relied on for performing the determination of whether or not at least some of the first actions constitute an AI attack event. For example, based on a result of the comparison of the weighted score with the predetermined threshold, the predetermined AI-based decision making engine may generate an output that includes an indication that details whether at least some of the first actions constitute an AI attack event. In some preferred approaches, the predetermined AI-based decision making engine may generate an output that includes an indication that at least some of the first actions constitute an AI attack event in response to the result of the comparison of the weighted score with the predetermined threshold including the weighted score not exceeding the predetermined threshold. In order to determine which of the first actions constitute an AI attack event, an investigative sub-process may be performed in which metrics of the first endpoint data of each of the first user devices are considered to determine which of the first actions are relatively furthest outliers from associated portions of the predetermined sample data. This way, at least a portion of the first user devices that are identified as being relatively furthest outliers from associated portions of the predetermined sample data are indicated in the output of the predetermined AI-based decision making engine as performing the first actions constitute an AI attack event. This subset of the relatively furthest outliers may be, e.g., a predetermined portion of the first user devices that are outliers, a predetermined number of the relatively furthest outliers, etc.

In contrast to some approaches described above, in some other approaches, the predetermined AI-based decision making engine may additionally and/or alternatively generate an output that includes an indication that the first actions do not constitute an AI attack event in response to the result of the comparison of the weighted score with the predetermined threshold including the weighted score matching or exceeding the predetermined threshold. The output of the predetermined AI-based decision making engine may additionally and/or alternatively include one or more predetermined types of information that serve as the indication, e.g., details of the comparisons that were performed, a list of the first actions that constitute an AI attack event, the user devices that performed the actions in the list, timestamp information of when the first actions were performed, a remedy for mitigating the AI attack event that is computed by the predetermined AI-based decision making engine based on an analysis of other AI attack events, etc.

In some approaches, the indication additionally and/or alternatively includes a statistical numerical probability that the first actions constitute an AI attack event. Accordingly, with reference again to FIG. 2A, method 200 includes optionally generating a statistical numerical probability that the first actions constitute an AI attack event, e.g., see operations 210 and 214. The statistical numerical probability is, in some approaches, a numerical value of a predetermined scale, e.g., 0%-100%, 0%-10%, 1%-100%, etc. Furthermore, in some approaches, the statistical numerical probability may additionally and/or alternatively be based on one or more factors other than the results of the comparison(s) described above. For example, the statistical numerical probability may, in some approaches, be based on a comparison of the output of the predetermined AI-based decision making engine with another output, e.g., a previous output generated by the predetermined AI-based decision making engine, an output of at least a second predetermined AI-based decision making engine such that the outputs of the first predetermined AI-based decision making engine and at least the predetermined AI-based decision making engine (or portions thereof such as the weighted values of the predetermined AI-based decision making engines) are summed to determine the statistical numerical probability, etc.

The output of the predetermined AI-based decision making engine may, in some approaches, be evaluated in order to determine how to respond. For example, decision 208 of method 200 includes determining whether an output of the predetermined AI-based decision making engine indicates that at least some of the first actions constitute an AI attack event. In response to a determination that the output of the predetermined AI-based decision making engine indicates that none of the first actions constitute an AI attack event, e.g., as illustrated by the "NO" logical path of decision 208, a notification may be generated and/or output that indicates that the first actions are not likely to constitute an AI attack event, e.g., see operation 212. It should be noted that, in some approaches, first actions that are determined to not likely constitute an AI attack event may still constitute an attack event. For example, the first actions may be determined to be initiated by an unauthorized user that is using and/or controlling the first user devices in an attempt to perform fraudulent actions. Accordingly, in some approaches, in response to a determination that the output of the predetermined AI-based decision making engine indicates that none of the first actions constitute an AI attack event, troubleshooting may optionally be performed in order to further verify whether the first actions constitute a manual attack event. This troubleshooting process may include checking records of users, e.g., user work schedules, user credential login sequences, user credential logout sequences, etc., to determine whether an authorized user and/or an unauthorized user was accessing one or more of the first user devices at the time the relatively first endpoint data was generated and/or obtained. This way, verification operations may be performed in order to determine whether the user accessing one or more of the first user devices was in fact the cause of the relatively abnormal first endpoint data.

For context, in some approaches in which an indication of the output of the predetermined AI-based decision making engine includes a statistical numerical probability that the first actions constitute an AI attack event that is less than a predetermined threshold value, the "NO" logical path of decision 208 may be followed. In contrast, in response to a determination that an output of the predetermined AI-based decision making engine indicates that at least some of the first actions constitute an AI attack event, an alert that indicates that at least some of the first actions likely constitute an AI attack event is generated and/or output, e.g., see operation 216. The alert may include predetermined information of the output of the predetermined AI-based decision making engine. For example, in some approaches, the alert includes the generated statistical numerical probability.

The alerts described above may, in some approaches, be output to a predetermined reporting destination. In some approaches in which the alert that is generated and/or output indicates that the first actions are not likely to constitute an AI attack event, the alert may be output to a predetermined database for storing information that may be used in subsequent iterations of method 200, e.g., as predetermined sample data that is known to not be associated with an AI attack event. In contrast, in some other approaches, the alert may be generated and/or out for mitigating, e.g., preventing, freezing, troubleshooting damage from, etc., the AI attack event that is determined to have occurred and/or to presently be occurring. In one or more of such approaches, the alert may be output to, e.g., a predetermined anomaly display portal that is monitored by an AI engine and/or an administrator in order to cause mitigating actions to be performed in order to prevent and/or recover from the AI attack event. Furthermore, in some approaches, feedback for the alerts may be received. This feedback may provide feedback as to whether further investigative and/or recovery processes deemed that the output of the predetermined AI-based decision making engine was accurate. This feedback may be fed back into the predetermined AI-based decision making engine, e.g., as a reward, as an additional training data set, etc., in order to further refine an accuracy of the predetermined AI-based decision making engine.

In some approaches, in response to a determination that an output of the predetermined AI-based decision making engine indicates that at least some of the first actions are performed by an AI-based computer program (based on a speed at which at least some of the applications are being performed) and/or in response to a determination that the output of the predetermined AI-based decision making engine indicates that at least some of the first actions constitute an AI attack event, a predetermined verification process may be performed. The predetermined verification process may include determining whether predetermined types of metrics of the first endpoint data fall within predetermined performance ranges that are associated with predetermined applications. The predetermined performance ranges that are associated with predetermined applications may, in some approaches, specifically be performance ranges of one or more actions, e.g., completing transactions, outputting emails, deleting messages, performing transfers of data, performing transfers of money, etc., that are known to be associated with and/or previously provided by computer program applications. In response to a determination that the predetermined types of metrics of the first endpoint data fall within the predetermined performance ranges, a conclusion may be reached that the first actions do not constitute an AI attack event. This predetermined verification process may be particularly useful in cases in which method 200 is deployed in a network environment in which business practices are performed that use the assistance of computer program applications of a user device for performing at least some actions. This way, first actions that are performed using computer program applications are not mistaken as constituting an AI attack event based on the performance metrics of such actions merely being beyond performance metric ranges that would be expected from a user manually performing such actions on a user device. In other words, behaviors that are performed by "good" robots are distinguished from other behaviors that constitute AI attack events.

With continued reference to the predetermined verification process described above, in response to a determination that the predetermined types of metrics of the first endpoint data do not fall within predetermined performance ranges, the alert described elsewhere above that indicates that the at least some of the first actions likely constitute an AI attack event may be output.

With continued reference to method 200, in some approaches, because the performance of actions that are performed in the network environment may change over time, in some approaches, the predetermined thresholds that are used in one or more operations of method 200 may optionally be ongoingly evaluated and/or dynamically changed. For example, assuming that actions performed in the network environment include stock market transactions, different metrics associated with such actions may change from day to day, hour to hour, minute to minute, etc. For example, news events may cause trade activities to relatively surge or halt, depending on the approach. Accordingly, in order to ongoingly evaluate the predetermined thresholds used in one or more approaches described herein, in some approaches, method 200 includes determining whether changes have been identified in both the predetermined sample data and the first endpoint data within a predetermined amount of time. For context, changes occurring in both the predetermined sample data and the first endpoint data within a predetermined amount of time may, in some approaches, be user tendency driven. In other words, users leading new changes in behavior (and thereby these changes not being led by AI attack events of AI bots) that are determined to not be anomalies may be identified based on the changes being determined to occur in both the predetermined sample data of other devices and the first endpoint data of the first user devices. It may also be realized that some users will follow these changes, and therefore this knowledge may be provided as context in a determination of a next iteration of method 200 and/or output of the predetermined AI-based decision making engine.

In some approaches, in response to changes being identified in both the predetermined sample data and the first endpoint data, where the changes occur within the predetermined amount of time, the predetermined threshold may be changed, e.g., see operation 220. However, in some approaches, a limit may be placed on the amount of change that is deemed acceptable. In other words, a relatively insignificant amount of change may be assumed to be based on changes in user tendencies, while relatively significant amounts of change may instead correspond to the actions constituting an AI attack event. Accordingly, a determination may be made as to whether the amount of change falls within a predetermined range of change, e.g., a tolerable amount of change. In response to a determination that the changes are within a predetermined range of change, the predetermined threshold may be adjusted a predetermined amount, e.g., such as an amount that is proportional to the amounts that the data change. In contrast, in response to a determination that the changes are not within the predetermined range of change, the alert described elsewhere above that indicates that at least some of the first actions likely constitute an AI attack event may be generated and/or output.

With continued reference to decision 218, in response to changes not being identified in both the predetermined sample data and the first endpoint data, the method 200 optionally ends, e.g., see "End". Furthermore, the predetermined threshold may, in some approaches, be maintained.

Several performance benefits are enabled by deploying the techniques of embodiments and approaches described herein in network environments. For example, these techniques provide the ability to determine the attack or attacker type (e.g., human or AI robot), in order to accurately determine appropriate response(s), countermeasures, and risks associated with the first actions. With respect to processing potential of computer systems and devices thereof within the field of network environments, these techniques relatively reduce the number of processing operations that are performed because AI attack events are identified and responded to. More specifically, this reduces an amount of processing operations that would otherwise be performed in an attempt to recover from these AI attack events in the event that the AI attack events were not identified and responded to using the techniques described herein. This is particularly important within the field of network environments going forward as AI-based attack events are likely to continue to increase, the relative sophistication of attacks is likely to continue to increase, and the losses due these attacks is therefore also likely to continue to increase.

Various use case embodiments in which the techniques of method 200 and other embodiments and approaches described herein may be deployed are described below.

A first use case embodiment of the techniques described herein may include a finance specific network environment, e.g., banking and/or trading. In such an embodiment, part of the industry context and/or normalization is preferably obtained in obtained endpoint data, e.g., from user devices used to perform trades, in order to provide the predetermined AI-based decision making engine with an input that may be used to generate an awareness of stock market activity. In some approaches, the obtained endpoint data may include, e.g., announcements regarding a company that may drive an increase and/or decrease in trading activity for that company. In some other approaches, the predetermined AI-based decision making engine may use the obtained endpoint data to detect a significant increase and/or decrease in trading volume for a stock at a much greater level than is being observed within the company being monitored, and based on this context, generate an output that indicates that this is acceptable abnormal behavior, i.e., actions not likely to constitute an AI attack event.

Another use case embodiment of the techniques described herein may include a public sector embodiment. In such an embodiment, the predetermined AI-based decision making engine may be configured to monitor and evaluate, e.g., metrics of endpoint data that is based on, e.g., new member registrations, predetermined sensitive services such as controlled licenses being issued at an increasing rate, etc., in order to determine whether such actions are likely to constitute an AI attack event.

It should be noted that the techniques described herein are novel because they establish an AI-based process for recognizing normal behavior by baselining individual actions, department actions, and industry (global) responses. Therefore, an understanding of whether behavior outside of the baseline is legitimate (does not constitute an attack event) or not is enabled. Additional problems solved by the techniques described herein include, using learned behavior to generate penetration test capabilities and/or actions, and improved relative efficiencies of robotic process automation, Furthermore, these techniques detect when activities are being performed by AI robots rather than by humans, and detecting traditional (non-AI) based attacks.

Figure 3:
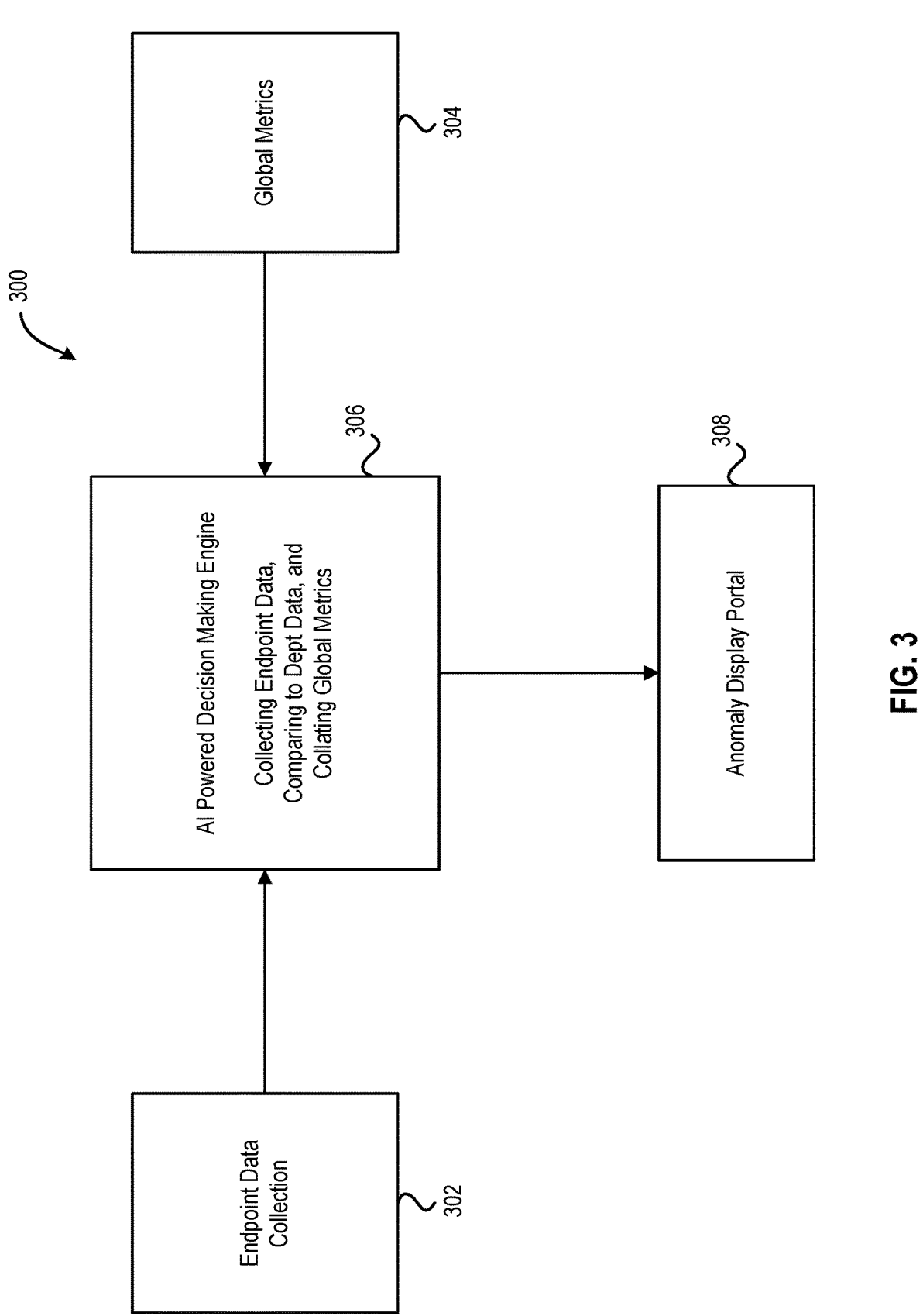
FIG. 3 is a flowchart of a method, in accordance with one embodiment of the present invention.

Now referring to FIG. 3, a flowchart of a method 300 is shown according to one embodiment. The method 300 may be performed in accordance with the present invention in any of the environments depicted in FIGS. 1-4, among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

It should be noted that, in some approaches, the flowchart of FIG. 3 illustrates a relatively high level overview of the flowchart of method 200. Method 300, in some approaches, relies upon an endpoint-based data collection mechanism, and instrumentation from key business systems (which may be collected through standard monitoring/logging infrastructure). This information is fed to an AI powered decision engine, to determine and update baselines, and determine when actions are moving outside of a baseline.

Within method 300, attributes are captured at endpoints. For example, operation 302 includes obtaining first endpoint data associated with first actions performed by one or more first user devices of a network environment. Global metrics may additionally and/or alternatively be obtained, e.g., see operation 304. These global metrics may serve as predetermined sample data. The obtained global metrics and the endpoint data are preferably fed as input into a predetermined AI-based decision making engine, which may be a learning and/or normalization system, e.g., see operation 306.

The AI-based decision making engine may be included in a normalization system that learns whether an attribute should be applied at an individual, department, or global outcome level. It should be noted that in some approaches, the global detection, may be relatively more linked to outcomes rather than behaviors, and this way, the comparison may be performed even though programming code that is used to perform one or more operations described herein may not be installed in other organizations and/or despite instance in which the information is deliberately siloed due to privacy concerns. An example of this includes cases in which the AI-based decision making engine is fed first endpoint data in which the number of transactions of a particular share of a stock increase due to known volatility inside the market rather than the individual numbers changing.

The AI-based decision making engine may be configured to assign a weighted score using the techniques described herein, and a probability that actions are considered outside of normal behavior may be determined. This output may be used to generate one or more types of alerts which may be output to a predetermined target pre-associated with the type of alert, e.g., see alert output to an anomaly display portal in operation 308. An organization that receives such an alert may then choose and/or adjust a threshold for the AI-based decision making engine to thereafter apply for determining whether actions that are performed within a network environment are considered relatively abnormal, and likely a bad actor robot.

Figure 4:
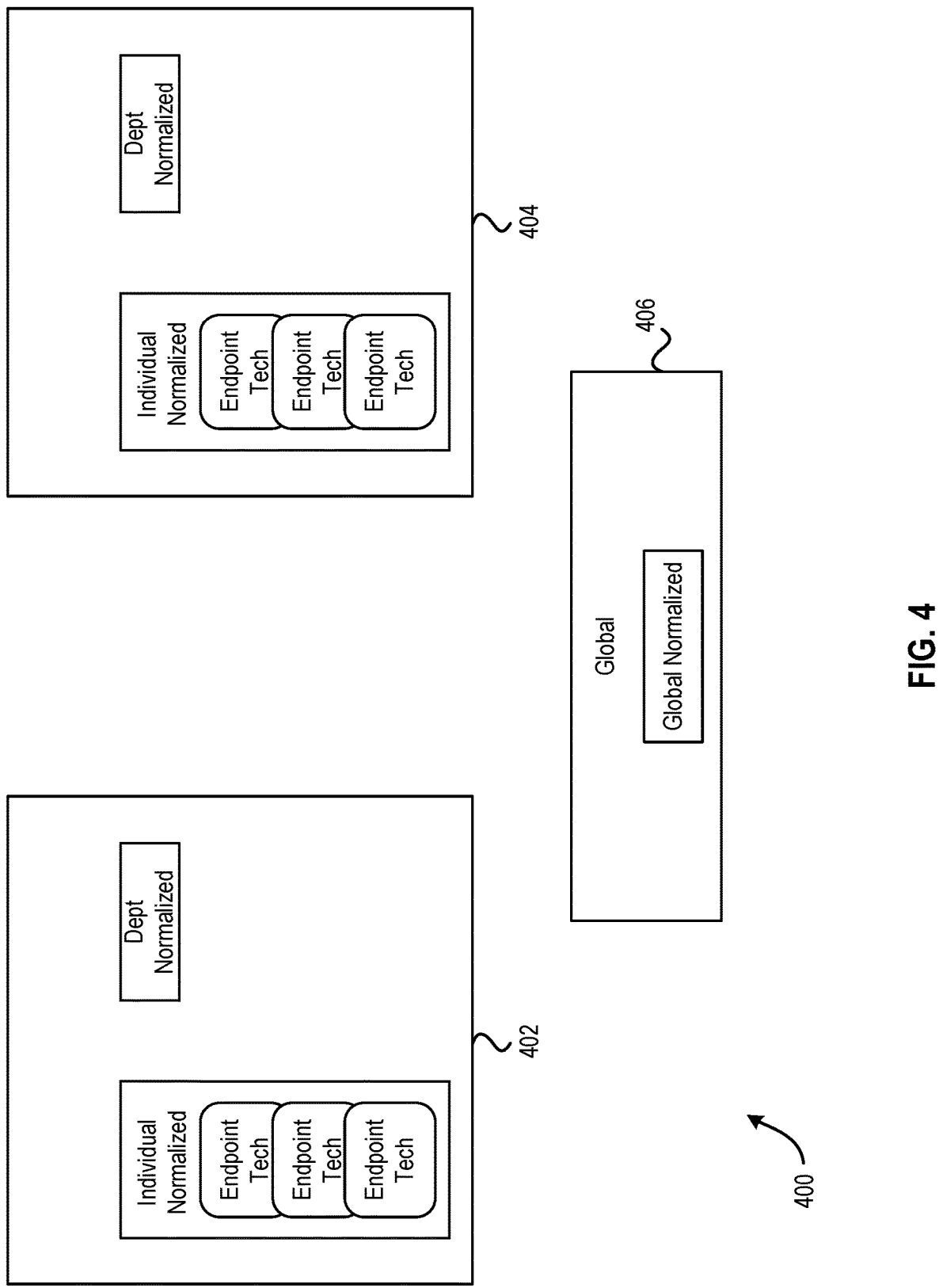
FIG. 4 is a network environment, in accordance with one embodiment of the present invention.

FIG. 4 depicts a network environment 400, in accordance with one embodiment. As an option, the present network environment 400 may be implemented in conjunction with features from any other embodiment listed herein, such as those described with reference to the other FIGS. Of course, however, such network environment 400 and others presented herein may be used in various applications and/or in permutations which may or may not be specifically described in the illustrative embodiments listed herein. Further, the network environment 400 presented herein may be used in any desired environment.

The network environment 400 includes a first organization 402 having a plurality of user devices, e.g., see endpoint devices "Endpoint Tech", a second organization 404 having a plurality of user devices, and a global scale collection of user devices 406. User behavior may be collected as endpoint data within one or more portions of the network environment and used to analyze first actions with respect to previous behavior in the context of the user, with respect to behavior of other user devices of the same team in the same organization department (first organization 404), with respect to behavior of other user devices of another team in another organization department (second organization 404), with respect to behavior across a global industry (global scale collection of user devices 406). It also recognizes that within an organization, some users will lead new/changed behaviors that some other users will follow. These mechanisms may be used to prevent false positives (as they are verified and normalized, e.g., see "Dept Normalized" and "Global Normalized"), and to assess actions in context.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method (CIM), the CIM comprising:
   obtaining first endpoint data associated with first actions performed by one or more first user devices of a network environment;
   inputting the first endpoint data into a predetermined artificial intelligence (AI)-based decision making engine, wherein the predetermined AI-based decision making engine determines, by performing a first predetermined comparison process using first endpoint data, whether the first actions constitute an AI attack event, wherein the first predetermined comparison process includes:
      obtaining predetermined sample data by performing a sampling on other user devices that perform second actions,
      comparing the first endpoint data to the predetermined sample data,
      assigning a weighted score to the first endpoint data based on the comparison,
      wherein the weighted score is based on a determined degree of similarity that the first endpoint data has with the predetermined sample data; and
      comparing the weighted score with a predetermined threshold; and
   in response to a determination that an output of the predetermined AI-based decision making engine indicates that at least some of the first actions constitute an AI attack event, outputting an alert that indicates that the at least some of the first actions likely constitute an AI attack event.

2. The CIM of claim 1, comprising: obtaining the predetermined sample data by performing a sampling on the one or more first user devices, wherein the sampling is performed prior to the first actions being performed.

3. The CIM of claim 1, wherein the other user devices are selected from the group consisting of: other user devices of a same organization that the one or more first user devices are members of, other user devices of a different organization than the organization that the one or more first user devices are members of, other user devices that also perform the first actions.

4. The CIM of claim 1, comprising:
   identifying, within a predetermined amount of time, changes in both the predetermined sample data and the first endpoint data; and
   in response to a determination that the changes are within a predetermined range of change, adjusting the predetermined threshold a predetermined amount.

5. The CIM of claim 1, comprising: generating a statistical numerical probability that the first actions constitute an AI attack event, wherein the alert includes the generated statistical numerical probability.

6. The CIM of claim 1, wherein predetermined types of metrics of the first endpoint data are compared to the same predetermined types of metrics of the predetermined sample data, wherein the predetermined types of metrics are selected from the group consisting of: a rate that actions are performed, an order in which actions are performed, a reason that actions are performed, a time of day that actions are performed, a number of user devices that contribute to a performance of a given action, and a magnitude of the actions that is based on a relative size of a transaction associated with the actions with respect to a predetermined business practice that the transaction is a part of.

7. The CIM of claim 1, comprising:
   in response to a determination that an output of the predetermined AI-based decision making engine indicates that at least some of the first actions are performed by a computer program, performing a predetermined verification process, wherein the determination that the output of the predetermined AI-based decision making engine indicates that the at least some of the first actions are performed by the computer program is made based on speed that the first actions are performed over a predetermined period of time, wherein the speed is determined based on time gaps between sequentially performed actions of the first actions, wherein the predetermined verification process includes:
      determining whether predetermined types of metrics of the first endpoint data fall within predetermined performance ranges that are associated with predetermined applications,
      in response to a determination that the predetermined types of metrics of the first endpoint data fall within predetermined performance ranges, concluding that the first actions do not constitute an AI attack event, and
      in response to a determination that the predetermined types of metrics of the first endpoint data do not fall within predetermined performance ranges, outputting the alert.

8. A computer program product (CPP), the CPP comprising:
   a set of one or more computer-readable storage media;
   program instructions, collectively stored in the set of one or more computer-readable storage media, for causing a processor set to perform the following computer operations:
   obtain first endpoint data associated with first actions performed by one or more first user devices of a network environment;
   input the first endpoint data into a predetermined artificial intelligence (AI)-based decision making engine, wherein the predetermined AI-based decision making engine determines, by performing a first predetermined comparison process using first endpoint data, whether the first actions constitute an AI attack event, wherein the first predetermined comparison process includes:

obtaining predetermined sample data by performing a sampling on other user devices that perform second actions, comparing the first endpoint data to the predetermined sample data, and assigning a weighted score to the first endpoint data based on the comparison, wherein the weighted score is based on a determined degree of similarity that the first endpoint data has with the predetermined sample data; and comparing the weighted score with a predetermined threshold; and in response to a determination that an output of the predetermined AI-based decision making engine indicates that at least some of the first actions constitute an AI attack event, output an alert that indicates that the at least some of the first actions likely constitute an AI attack event.

9. The CPP of claim 8, the computer program product further comprising: program instructions, collectively stored in the set of one or more storage media, for causing the processor set to perform the following computer operations: obtain the predetermined sample data by performing a sampling on the one or more first user devices, wherein the sampling is performed prior to the first actions being performed.

10. The CPP of claim 8, wherein the other user devices are selected from the group consisting of: other user devices of a same organization that the one or more first user devices are members of, other user devices of a different organization than the organization that the one or more first user devices are members of, other user devices that also perform the first actions.

11. The CPP of claim 8, the computer program product further comprising: program instructions, collectively stored in the set of one or more storage media, for causing the processor set to perform the following computer operations:

identify, within a predetermined amount of time, changes in both the predetermined sample data and the first endpoint data; and in response to a determination that the changes are within a predetermined range of change, adjust the predetermined threshold a predetermined amount.

12. The CPP of claim 8, the computer program product further comprising: program instructions, collectively stored in the set of one or more storage media, for causing the processor set to perform the following computer operations: generate a statistical numerical probability that the first actions constitute an AI attack event, wherein the alert includes the generated statistical numerical probability.

13. The CPP of claim 8, wherein predetermined types of metrics of the first endpoint data are compared to the same predetermined types of metrics of the predetermined sample data, wherein the predetermined types of metrics are selected from the group consisting of: a rate that actions are performed, an order in which actions are performed, a reason that actions are performed, a time of day that actions are performed, a number of user devices that contribute to a performance of a given action, and a magnitude of the actions that is based on a relative size of a transaction associated with the actions with respect to a predetermined business practice that the transaction is a part of.

14. The CPP of claim 8, the computer program product further comprising: program instructions, collectively stored in the set of one or more storage media, for causing the processor set to perform the following computer operations:

in response to a determination that an output of the predetermined AI-based decision making engine indicates that at least some of the first actions are performed by a computer program, perform a predetermined verification process, wherein the determination that the output of the predetermined AI-based decision making engine indicates that the at least some of the first actions are performed by the computer program is made based on speed that the first actions are performed over a predetermined period of time, wherein the speed is determined based on time gaps between sequentially performed actions of the first actions, wherein the predetermined verification process includes:

determining whether predetermined types of metrics of the first endpoint data fall within predetermined performance ranges that are associated with predetermined applications, in response to a determination that the predetermined types of metrics of the first endpoint data fall within predetermined performance ranges, concluding that the first actions do not constitute an AI attack event, and in response to a determination that the predetermined types of metrics of the first endpoint data do not fall within predetermined performance ranges, outputting the alert.

15. A computer system (CS), the CS comprising:

a processor set;

a set of one or more computer-readable storage media;

program instructions, collectively stored in the set of one or more storage media, for causing the processor set to perform the following computer operations:

obtain first endpoint data associated with first actions performed by one or more first user devices of a network environment;

input the first endpoint data into a predetermined artificial intelligence (AI)-based decision making engine, wherein the predetermined AI-based decision making engine is configured to determine, by performing a first predetermined comparison process using first endpoint data, whether the first actions constitute an AI attack event, wherein the first predetermined comparison process includes:

obtaining predetermined sample data by performing a sampling on other user devices that perform second actions, comparing the first endpoint data to the predetermined sample data, assigning a weighted score to the first endpoint data based on the comparison, wherein the weighted score is based on a determined degree of similarity that the first endpoint data has with the predetermined sample data; and comparing the weighted score with a predetermined threshold; and in response to a determination that an output of the predetermined AI-based decision making engine indicates that at least some of the first actions constitute an AI attack event, output an alert that indicates that the at least some of the first actions likely constitute an AI attack event.

16. The CS of claim 15, wherein the other user devices are selected from the group consisting of: other user devices of a same organization that the one or more first user devices are members of, other user devices of a different organization than the organization that the one or more first user devices are members of, other user devices that also perform the first actions.

\*　\*　\*　\*　\*